United States Patent
Arumugam et al.

(10) Patent No.: US 11,290,269 B2
(45) Date of Patent: Mar. 29, 2022

(54) SELF CERTIFICATION OF DEVICES FOR SECURE TRANSACTIONS

(71) Applicant: Visa International Service Association, San Francisco, CA (US)

(72) Inventors: Avinash Arumugam, San Francisco, CA (US); Quan Wang, Foster City, CA (US); Kelvan Howard, San Francisco, CA (US); Jerry Wald, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/772,720

(22) PCT Filed: Dec. 13, 2017

(86) PCT No.: PCT/US2017/066204
§ 371 (c)(1),
(2) Date: Jun. 12, 2020

(87) PCT Pub. No.: WO2019/117899
PCT Pub. Date: Jun. 20, 2019

(65) Prior Publication Data
US 2020/0322137 A1  Oct. 8, 2020

(51) Int. Cl.
*H04L 29/06* (2006.01)
*H04L 9/08* (2006.01)
(Continued)

(52) U.S. Cl.
CPC ............ *H04L 9/088* (2013.01); *H04L 9/30* (2013.01); *H04L 9/3239* (2013.01); *H04L 9/3247* (2013.01); *H04L 9/3263* (2013.01)

(58) Field of Classification Search
CPC ... H04L 9/00; H04L 9/088; H04L 9/30; H04L 9/3247; H04L 9/3263; G06F 21/00; H04W 12/00
See application file for complete search history.

(56) References Cited

U.S. PATENT DOCUMENTS 5,745,574 A    4/1998  Muftic
6,035,402 A    3/2000  Vaeth et al.
(Continued)

FOREIGN PATENT DOCUMENTS

| EP | 3119056    | 1/2017 |
| JP | 2010500851 | 1/2010 |
| JP | 2017175226 | 9/2017 |

OTHER PUBLICATIONS

PCT/US2017/066204 , "International Search Report and Written Opinion", dated Sep. 3, 2018, 14 pages.
(Continued)

*Primary Examiner* — Joseph P Hirl
*Assistant Examiner* — Leynna Truvan
(74) *Attorney, Agent, or Firm* — Kilpatrick Townsend & Stockton LLP

(57) ABSTRACT

Embodiments of the invention are directed to techniques for enabling self-certification of an electronic device to result in the issuance of a security certificate that the electronic device may use to authenticate itself to another entity. In some embodiments, the device is caused to initiate the self-certification process upon determining that a status of a current security certificate is no longer valid. In some embodiments, an electronic device may communicate with a certificate authority, which may generate a set of policy data that indicates permissions for the electronic device. The electronic device may then generate an electronic record to be associated with the security certificate, which it may sign using a private key. The certificate authority may then verify
(Continued)

the authenticity of the signed electronic record using a public key associated with the electronic device. The electronic record may be appended to some collection of records.

19 Claims, 7 Drawing Sheets

(51) Int. Cl.
  *H04L 9/30* (2006.01)
  *H04L 9/32* (2006.01)

(56) References Cited

U.S. PATENT DOCUMENTS

| | | |
|---|---|---|
| 2004/0030888 A1 | 2/2004 | Roh et al. |
| 2006/0059346 A1* | 3/2006 | Sherman .............. H04L 63/0823 713/175 |
| 2013/0159021 A1* | 6/2013 | Felsher .............. G06Q 30/0283 705/3 |
| 2013/0318354 A1* | 11/2013 | Entschew ............. H04L 9/3263 713/175 |
| 2015/0365394 A1 | 12/2015 | Fitch et al. |
| 2016/0098723 A1* | 4/2016 | Feeney ................ G06Q 20/065 705/75 |
| 2017/0041151 A1 | 2/2017 | Kommireddy et al. |
| 2017/0070500 A1* | 3/2017 | Hockey .............. H04L 63/0807 |
| 2017/0093581 A1 | 3/2017 | Roth et al. |
| 2017/0099148 A1 | 4/2017 | Ochmanski et al. |
| 2017/0126665 A1 | 5/2017 | Dixon |
| 2017/0330179 A1* | 11/2017 | Song .................... G06Q 20/065 |

OTHER PUBLICATIONS

Ford et al., "Building the Infrastructure for Digital Signatures and Encryption", Secure Electronic Commerce, 1997, pp. 159-189.
Application No. JP2020-532624, Office Action, dated Oct. 5, 2021, 5 pages.
Application No. EP17934920.4, Extended European Search Report, dated Nov. 13, 2020, 7 pages.

* cited by examiner

SELF CERTIFICATION OF DEVICES FOR SECURE TRANSACTIONS

CROSS-REFERENCE TO RELATED APPLICATIONS

The present application is a 371 National Phase of PCT Patent Application No. PCT/US2017/066204 filed on Dec. 13, 2017, which is incorporated herein by reference in its entirety for all purposes.

BACKGROUND

Households typically include a number of appliances associated with goods and services that are purchased by users on a regular basis. For example, consumers have refrigerators for storing food, gas meters for measuring gas usage, electric meters for measuring power usage, and water meters for measuring water usage. Consumers are often inconvenienced by regular paper bills associated with the goods and services. To address this concern, some electronic devices have been adapted to manage resources associated with their primary function. For example, a water purifier may be configured to automatically order replacement water filters upon determining that a current water filter should be replaced. However, this has created new opportunities for fraud which did not exist prior to the existence of these devices in which an electronic device may be stolen, duplicated, inappropriately associated with an account, or otherwise compromised, and then used to order items for an unauthorized party.

Embodiments of the invention address these and other problems, individually and collectively.

BRIEF SUMMARY

One embodiment of the invention is directed to a method comprising in response to determining that a security certificate is necessary, transmitting a request to a certificate authority, receiving information to be used in generating an electronic record, generating the electronic record to comprise at least an electronic identifier and the information to be used in generating the electronic record, signing at least a portion of the electronic record using a private key, transmitting the electronic record to the certificate authority, and receiving access to the security certificate upon verification of the electronic record by the certificate authority.

Another embodiment of the invention is directed to an electronic device comprising, a processor, and a memory coupled to the processor, the memory comprising code that, when executed by the processor, causes the electronic device to perform a number of operations. In particular, the electronic device may be caused to transmit a request to a certificate authority, receive, from the certificate authority, information to be used in generating an electronic record, generate the electronic record to comprise at least an electronic identifier and the information to be used in generating the electronic record, sign at least a portion of the electronic record using a private key, transmit the electronic record to the certificate authority, and receive a security certificate upon verification of the electronic record by the certificate authority.

Another embodiment of the invention is directed to a certification authority network comprising a record of electronic records, and a plurality of nodes. In the certification authority, each of the plurality of nodes including instructions that, when executed, cause the node to receive a request for a security certificate from an electronic device, provide, to the electronic device, information to be used in generating an electronic record, receive, from the electronic device, the generated electronic record including at least a signature portion, identify a public key associated with the electronic device, verify the signature portion of the generated electronic record using the public key, and upon verifying the signature portion of the generated electronic record, appending the generated electronic record to the record of electronic records.

DETAILED DESCRIPTION

Figure 1:
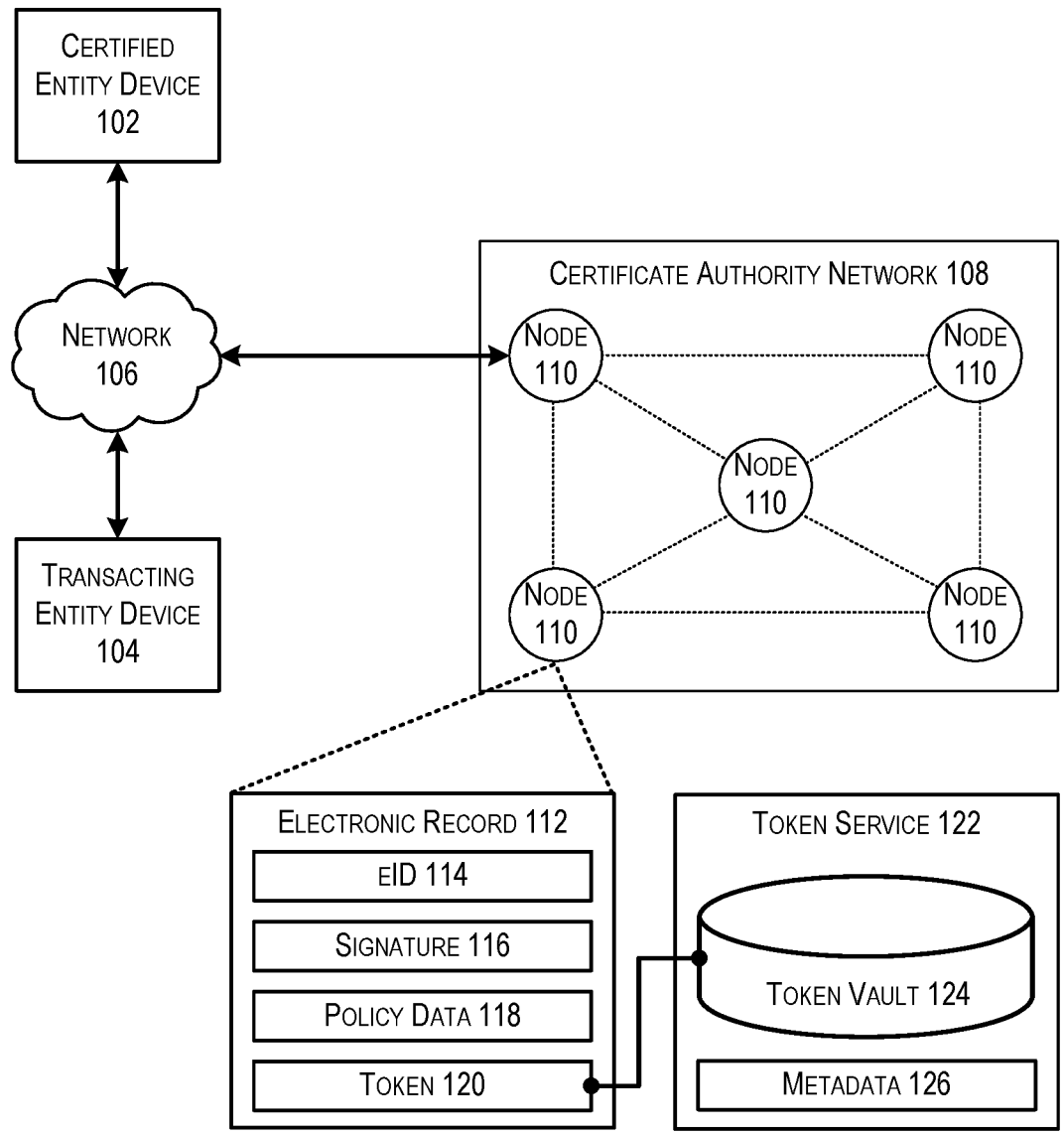
FIG. 1 depicts a block diagram of an exemplary system 100 for certifying an authenticity of a first device to a second device in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "blockchain" may be a distributed database that may be used to maintain a continuously growing list of records, called blocks. In some implementations, each block contains a timestamp and a link to a previous block. A blockchain is typically managed by a peer-to-peer network collectively adhering to a protocol for validating new blocks, but may be managed by a single entity. Once recorded, the data in any given block cannot be altered retroactively without the alteration of all subsequent blocks and the collusion of the network. This allows the blockchain to serve as a data record between parties that is both verifiable and permanent. A blockchain may be spread out over a plurality of nodes (e.g., of a distributed computing system).

A "computing device" may be any suitable electronic device capable of communicating with, and/or interacting with other devices. Examples of computing devices may include a mobile phone, a smart phone, a personal digital assistant (PDA), a laptop computer, a desktop computer, a server computer, a vehicle (e.g., an automobile), a thin-client device, a router, a modem, a tablet PC, a printer, etc. Additionally, computing devices may be any type of wearable technology device, such as a watch, earpiece, glasses, etc. The computing device may include one or more processors capable of processing input. The computing device may also provide remote communication capabilities to a network. Examples of remote communication capabilities include using a mobile phone (wireless) network, wireless data network (e.g., 3G, 4G or similar networks), Bluetooth, Bluetooth Low Energy (BLE), Wi-Fi, Wi-Max, or any other communication medium that may provide access to a network such as the Internet or a private network. A computing device may be associated with a username, a password, an electronic identifier, one or more asymmetric keys that may be used for asymmetric encryption, one or more symmetric keys that may be used for symmetric encryption, or the like. A computing device may be configured to access and/or manage a distributed database (e.g., a blockchain).

A "cryptographic key" may be any string of bits used by a cryptographic algorithm to transform plain text into cipher text or vice versa. Cryptographic keys may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

An "electronic device," may be any device that accomplishes its purpose electronically. An electronic device may have multiple functions. For example, an electronic device may have a primary function and one or more secondary functions. A primary function may be the function that most closely aligns with the electronic device's purpose. An example of an electronic device may be a machine-to-machine device.

A "electronic identifier" may include any suitable distinctive set of characters used to identify an entity (e.g., a device, person, or network domain). An exemplary electronic identifier may include any suitable number or type of characters (e.g., numbers, graphics, symbols, or other information) that may uniquely represent the entity. By way of example, an electronic identifier may be a serial number, partial serial number, a media access control address, a device name/nickname, a network address at which the entity may be found, or the like. In some embodiments, an electronic identifier may be formatted such that it may be independently generated by any entity in possession of certain information. For example, an electronic identifier for a person may comprise a combination of a country code, person's name, date of birth, and last four digits of a social security number such as "SHA256(USA*JOHN SMITH*19700101*1234)." Hashing this value may result in a seemingly random string of characters, such as "444E982513BF546050C2D079FF5D65AB6E318E1AB5 C1C." In this example, the person's electronic identifier may be independently generated by any entity in possession of the country code, person's name, person's date of birth, and last four digits of the person's social security number as well as the hashing algorithm.

An "electronic record" may be any record of information stored electronically. For example, an electronic record may be a record of an action taken with respect to an entity associated with an electronic identifier. In some embodiments, an electronic record may be compiled by identifying each of the electronic records recorded in a distributed environment that are associated with a particular electronic identifier. In some embodiments, the electronic record may include a portion generated by, and signed using a private key associated with, the user with which the electronic identifier is associated. In some embodiments, the electronic record may be in the form of a blockchain.

A "machine-to-machine device" may be any suitable electronic device capable of communicating with, and/or interacting with other devices. A machine-to-machine device may have a primary function that is unrelated to communicating with other electronic devices. For example, a machine-to-machine device may be a refrigerator that, in addition to preserving food, is capable of interacting with one or more other electronic devices. In some embodiments, a machine-to-machine device may be associated with an electronic identifier. The electronic identifier may be used by a certificate authority to determine the type of device for a particular machine-to-machine device. Examples of machine-to-machine devices may include gas and electric meters, refrigerators, lamps, thermostats, printers, automobiles, fire alarms, home medical devices, home alarms, motorcycles, boats, televisions, etc.

A "policy set" may be a set of rules or configuration settings that indicates one or more actions are allowed and/or should be performed. In some cases, the policy set also includes conditions upon which those actions are to be performed. In some embodiments, a policy set may include conditional instructions, such as "if x_condition occurs, then perform y_action." In some embodiments, a policy set may include a list of transactions that are allowed for a particular electronic device or security certificate. For example, a certificate authority may identify, based on an electronic identifier, a type of device that the policy set is related to. The certificate authority may then create a custom policy set for that device based on the device's type. By way of illustration, upon determining that a device is a water meter, the certificate authority may create a policy set for the water meter that only allows it to conduct transactions related to water usage. In this example, the policy set may be stored at the certificate authority in relation to the water meter and at least a portion of the policy set may be provisioned onto the water meter (e.g., within a security certificate).

A "private key" is a type of cryptographic key that is kept secret by a party. A private key may be used to sign transactions such that they may be verified using the blockchain network.

The term "provisioning" may include any preparation and/or configuring of a device to enable it to perform a function. For example, provisioning may include storing rules or instructions on a device to direct the device's actions. In some embodiments, a device may be provisioned with a security certificate that authenticates the device and enables the device to communicate with other devices. The security certificate may enable the device to execute transactions on a user's behalf without active input from the user.

A "public key" may be a type of cryptographic key that is distributed to, or available to, some entity over than a party holding a corresponding private key. In some embodiments, the key may be publically available, while in other cases it may be distributed to nodes in a network, but the network itself may not be accessible to the general public. A public key may be made available to nodes of a blockchain network and/or resource providers so that signed transactions associated with the public key may be verified by the nodes.

A "security certificate" may be any electronic document that may be used to authenticate an entity. In some embodiments, a security certificate may include encryption information that may be used to encrypt data sent to or from the owner of the security certificate. By way of example, the security certificate may be a Secure Sockets Layer (SSL) certificate, which is a global standard security technology that enables encrypted communication between a web browser and a web server.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "smart contract" may be a computer protocol intended to facilitate, verify, or enforce the performance of a set of policy data (or rules). A smart contract may be included in a blockchain record. In some embodiments, a smart contract associated with a blockchain may be visible to each participant of the blockchain. Smart contracts are an example of a set of policy data and can be used to determine permissions to be associated with a security certificate.

A "token" may include an identifier for a piece of information that is a substitute for the actual information. In some embodiments, tokens may be used to substitute payment information, such as a primary account number (PAN). In these embodiments, a token may be used in place of a PAN to initiate, authorize, settle or resolve a payment transaction or represent the original credential in other systems where the original credential would typically be provided. In some embodiments, a token may be provided to an entity that wishes to authenticate a security certificate, the token may be relayed by the receiving party to a token service which issued the token. In these embodiments, if the receiving party is determined to be authorized to authenticate the security certificate, then information related to the security certificate may be retrieved from a token vault and provided to the receiving party. A token value may be generated such that the recovery of the substituted information from the token value may not be computationally derived. Further, in some embodiments, the token format may be configured to allow the entity receiving the token to identify it as a token and recognize the entity that issued the token. A token may be associated with a policy set and/or security certificate.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key. For example, a verification process may involve independently generating a value to be verified (e.g., a hash value from provided data). The verification process may also involve performing a cryptographic operation on the information to be verified (which may involve the use of a public key for the entity associated with the information to be verified) to produce a plain text version of the information to be verified. The verification process may then involve comparing the plain text version of the information to be verified to the independently generated value to determine a match. If the two values match, then it is highly likely that the information to be verified was signed using the entity's private key. This verifies that the information likely originated from the entity which claims to have provided the information.

Details of some embodiments of the present invention will now be described.

Embodiments of the invention are directed to techniques for enabling self-certification of an electronic device. The certification of the device may result in the issuance of a security certificate that the device may use to authenticate itself to another entity (e.g., in a transaction). In some embodiments, the device is caused to initiate the self-certification process upon determining that a status of a current security certificate is no longer valid or that an ownership status of the device has changed. In some embodiments, each electronic device may include special-purpose hardware and software that causes the electronic device to perform at least a portion of the functions described herein. Various types of electronic devices may be involved in the described system. By way of illustration, an electronic device may be a webserver that hosts a website in one example. By way of further illustration, an electronic device may be a machine-to-machine device (e.g., an internet of things (IoT) device) that performs a function unrelated to the current disclosure in a second example. In this second example, the machine-to-machine device may include an integrated circuit configured to execute embodiments of the disclosure.

In order to obtain a security certificate in accordance with the system described herein, an electronic device may communicate with a certificate authority, which may be a network or distributed computing system. The electronic device may transmit an electronic identifier (i.e., an identifier unique to the electronic device) as well as other device-specific or user-specific information to the certificate authority. In some embodiments, the certificate authority may identify an account related to the electronic device (e.g., based on the user-specific information). In some embodiments, the certificate authority may generate a set of policy data (e.g., a smart contract) that indicates permissions for the electronic device based on a type or category of the electronic device as well as user-defined constraints (e.g., based on account information). In some embodiments, the certificate authority may store at least a portion of the transmitted information in relation to a token. The certificate authority may then respond to the electronic device's transmission by providing information to be used in generating an electronic record. For example, the certificate authority may provide the set of policy data, the token, and/or an offset value to be used in an electronic signature.

Upon receiving the above information, the electronic device may generate an electronic record to be associated with the security certificate. This will be described in greater detail below. Once an electronic record has been generated, the electronic device may sign the electronic record using a private key associated with the electronic device. In some embodiments, the private key may be stored on the electronic device by a manufacturer of the electronic device. The signed electronic record may be provided to the certificate authority, which may then verify the authenticity of the generated electronic record using a public key associated with the electronic device. Once verified, the electronic record may be appended to a database or other record of electronic records. A security certificate may be set to expire on a periodic basis in order to force the electronic device to renew its security certification. In some cases, the security certificate may be valid under specific conditions. For example, the security certificate may be invalidated upon detecting that the electronic device has been moved to a substantially new location.

FIG. 1 depicts a block diagram of an exemplary system 100 for certifying an authenticity of a first device to a second device in accordance with at least some embodiments. The system 100 includes multiple entity devices, including at least a certified device 102 and a transacting device 104. One or more of the entity device 102 and the transacting device 104 may be in communication with a network 106. Additionally, the entities may be in communication with a certificate authority network 108, which may include a number of nodes 110.

The certified device 102 may be any device capable of self-certification using embodiments of the system described herein. In some embodiments, the certified device 102 may be a device configured to interact with other electronic devices (e.g., a machine-to-machine device). In some embodiments, the certified device 102 may be a webserver or other electronic device capable of hosting a network document (e.g., a website). The certified device 102 may be configured to, upon determining that certification is required, communicate with a certificate authority network 108 in order to generate an up-to-date security certificate. In some embodiments, the certified device 102 may determine that certification is required upon determining that a current certification is now expired. In some embodiments, the certified device 102 may determine that certification is required upon detecting that ownership of the certified device 102 has changed. In some embodiments, a user may connect with the certified device with another electronic device in order to provide information related to the user. For example, a user may connect with the certified device via a mobile phone.

The transacting device 104 may be any device capable of communicating with the certificate authority network 108 in order to verify the authenticity of a security certificate associated with the certified device 102. In some embodiments, the transacting device 104 may be a resource provider or another entity that controls access to a resource. The transacting device 104 may transact with the certified device 102 in order to provide access to the managed resource. In some embodiments, each transacting device 104 may be configured to perform a particular type of transaction. In these embodiments, the transacting device 104 may, in addition to verifying the authenticity of a security certificate for the certified device 102, verify that the particular type of transaction to be conducted by the transacting device 104 is a type of transaction that the certified device 102 is authorized to conduct.

In some examples, the network 106 may include any one or a combination of many different types of networks, such as cable networks, the Internet, wireless networks, cellular networks, and other private and/or public networks.

A certificate authority network 108 may be a network or distributed computing environment which includes a number of nodes 110. In some embodiments, the certificate authority network 108 may maintain at least one blockchain database, which may include a number of blocks of electronic records 112 stored in a chain (e.g., each block contains a timestamp and a link to a previous block), such that the certificate authority network 108 maintains a complete history of transactions in which a number of entities have been involved.

An electronic record 112 may be any record of an issuance of a security certificate stored electronically. In some embodiments, the certificate authority network 108 may be a blockchain network and the electronic record may be a blockchain record. Each electronic record 112 may be associated with a particular electronic identifier (eID) 114, that corresponds to a particular entity. Additionally, each electronic record 112 may be signed, or include a signature 116 that can be used to verify the authenticity of the electronic record 112. The electronic record 112 may also include policy data 118 that indicates what transactions may, or may not, be performed by the entity associated with the electronic record 112. Additionally, each electronic record 112 may include a token 120, which may be mapped to a token stored by a token service 122.

A token service 122 may be any suitable entity that maintains a record of a mapping between account data and a token. In some embodiments, the token service 122 may maintain a token vault 124. Each of the tokens in the token vault 124 may be mapped to metadata 126 associated with an entity or account. In some embodiments, metadata 126 may include information related to the entity that can be updated or changed. For example, the metadata 126 may include general information associated with the entity, a location or address associated with the entity, service or warranty information associated the entity, or any other suitable information associated with the entity. Although FIG. 1 depicts the use of a token and token service to store metadata associated with the electronic identifier, some embodiments of the disclosure may simply map the electronic identifier to metadata stored in a database (i.e., no token is required). However, the use of tokens in the manner described provides a higher level of security than those embodiments, as even if an unauthorized party is able to gain access to the metadata stored by the token service, they would be unable to determine what device 102 is associated with that metadata.

Although FIG. 1 describes the electronic record as being stored in a blockchain database (which is type of a distributed database), it should be recognized that although a blockchain database is typically a non-relational database, the current system may include relational database elements (e.g., token 120) that enable mappings to one or more other databases. Hence, the description of a blockchain database herein is merely illustrative and may refer to a database model that does not match, and may provide certain advantages over, conventional blockchain database models. Furthermore, it should be recognized that the electronic record may be stored in any type of database (relational or non-relational and distributed or non-distributed) using any suitable data storage protocols. Any description of a particular type of data storage provided herein is intended to be illustrative in nature and should not be construed as being limiting. It is intended that the description encompass any suitable data storage means that would be recognized as an equivalent to one skilled in the art. For example, in some embodiments, each electronic record may be stored as a separate document in a document-oriented database (e.g., an XML database). In another example, in some embodiments, each electronic record may be stored as an instance of an object within an object-oriented database.

It should be noted that in some embodiments, the electronic record 112 may be a blockchain record. Hence, information included in the electronic record 112 is typically immutable (i.e., permanent or unable to be altered) by virtue of being included in the blockchain. However, in these embodiments, the metadata 126 maintained by the token service 122 may be edited or otherwise updated independent of the electronic record 112. In this way, information may be maintained by the certificate authority network 108 with respect to an entity such that at least a first portion of the information is immutable and at least a second portion of the information is editable (e.g., by a user associated with the entity).

By way of illustrating interactions between the various components depicted herein, consider the following scenario in which the certified device 102 is a machine-to-machine device capable of replenishing a resource associated with its primary function (e.g., a washing machine capable of ordering more laundry detergent), and the transacting entity device 104 may be a computing device operated by a resource provider that supplies the resource (e.g., a computing device operated by a retail entity). When possession of the certified device 102 is passed to a new owner, that owner may provide information to the system that indicates the new ownership status. In some embodiments, this might involve the user communicating directly with the certified device 102 using a mobile phone or other device. In some embodiments, the user may log into an account maintained by the certificate authority network 108 to update account details for the certified device 102. Once the system has received the new information (or upon determining that a current security certificate has expired), a process to obtain a security certificate may be initiated. In some embodiments, the process may be initiated by the certified device 102 by the certified device 102 transmitting an electronic identifier to the certificate authority network 108. In some embodiments, the process may be initiated by the certificate authority network 108. To do this, the certificate authority network 108 may use one or more techniques to determine and verify the reliability/authenticity of the certified device 102. Once verified, the certificate authority network 108 may generate a set of policy data 118 that indicates the permissions that the certified device 102 will have. The policy data 118 may be generated based on a type or category of the certified device 102 (e.g., dishwashers can only purchase dish soap, etc.), constraints set by a user (e.g., this certified device 102 cannot spend more than $50.00 per transaction, etc.), or some combination of the two. Based on this policy data 118, an electronic record 112 is generated for the certified device 102. The electronic record 112 may be signed by the certified device 102, a user of the certified device 102, the certificate authority network 108, or any combination of those entities. The electronic record 112 may be signed by an entity using a private key associated with that entity. A security certificate may then be generated for the certified device 102 that refers to the corresponding electronic record 112. In some embodiments, the process described above may be performed automatically (e.g., without human interaction), such as upon determining that a current security certificate has expired.

Continuing with the above example, the certified entity device 102 may initiate a transaction for a resource with a transacting entity 104. To do this, the certified entity device 102 may transmit a transaction request to the transacting entity 104 that includes an indication of the resource to be obtained, an indication of a payment method, and at least one of either an electronic identifier or the security certificate for the certified entity device 102. Before conducting the transaction, the transacting entity device 104 may first verify the authenticity of the security certificate as well as ensure that the requested transaction is within the scope of the policy data 118 associated with the security certificate. For example, the transacting entity device 104 may determine whether the certified entity device 102 has authority to conduct the transaction that it is requesting. In some embodiments, the transacting entity device 104 may also verify the authenticity of the certified entity device 102. Upon determining that the security certificate is authentic and that the certified entity device 102 is authorized to perform the transaction, the transacting entity device 104 may initiate the transaction.

It should be noted that in some embodiments, the transacting entity device 104 and/or the certificate authority network 108 may use one or more techniques to determine and verify the reliability or authenticity of a previously-unknown entity (e.g., the certified entity device 102). For example, the certificate authority network 108 may need to verify that a user registering the device 102 is actually the owner of the device 102. One such technique, which uses indirect reliability associations and thereby decreases the likelihood of fraudulent interactions while enabling the entities to interact in a secure manner, is described in U.S. patent application Ser. No. 15/806,287, to Wang et al., entitled "CONDUCTING SECURE INTERACTIONS UTILIZING RELIABILITY INFORMATION," which is herein incorporated by reference in its entirety.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy. For example, suitable communications media for communications between the components shown in FIG. 1 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, Bluetooth, Bluetooth Low Energy (BLE), and/or the like); and/or the like.

Figure 2:
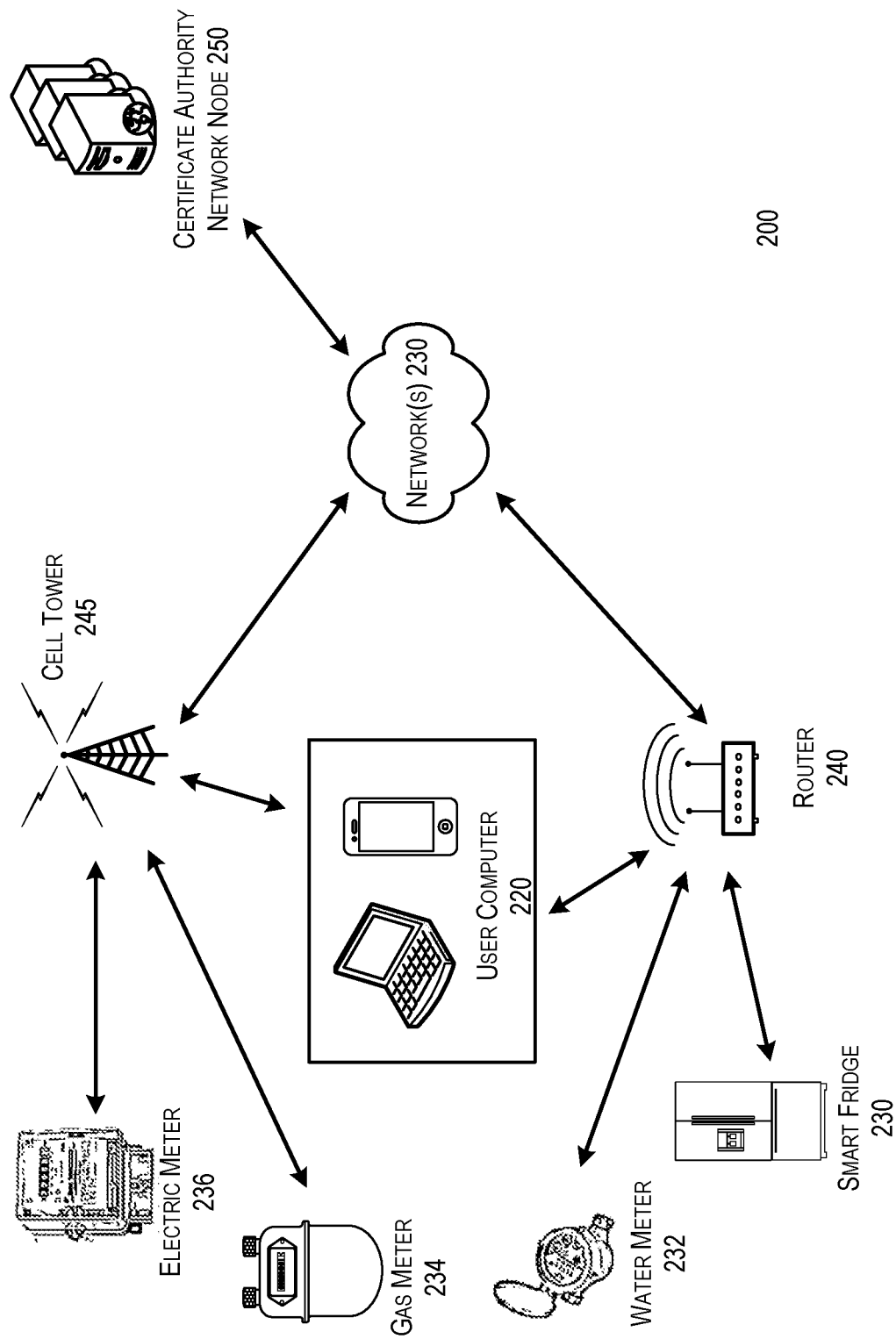
FIG. 2 depicts an example system comprising a number of components in accordance with at least some embodiments.

FIG. 2 depicts an example system 200 comprising a number of components in accordance with at least some embodiments. A user device 220, a certificate authority network node 250, and one or more machine-to-machine devices (e.g., smart refrigerator 230, water meter 232, gas meter 234, and electric meter 236) may all be in direct or indirect communication with one another via a network connection 230, a wireless router 240, a cell tower 245, or any other suitable means of communication.

As noted above, a machine-to-machine device may be any device capable of communicating with, and/or interacting with other devices. Each machine-to-machine device may be configured to perform one or more functions unrelated to the device's ability to interact. For example, the smart refrigerator 230 (one example of the M2M or machine-to-machine device) may comprise both refrigeration and computing capabilities. Although the smart refrigerator 230 is primarily utilized as a means of storing and refrigerating food, it has secondary functions that allow it to communicate with other devices, making it a machine-to-machine device. The machine-to-machine device may include an electronic identifier, which may be provided by a manufacturer of the machine-to-machine device. The electronic identifier may serve as a communication address for the machine-to-machine device, and it may be a secure electronic identifier based on a trusted hardware root of trust (so that integrity/confidentiality can be protected). In some embodiments, the manufacturer may be a trusted issuer of confidentially protected electronic identifiers. In some embodiments, an electronic identifier may be a serial number or other identifier for the machine-to-machine device.

The machine-to-machine device may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities.

Information provisioned onto the machine-to-machine device (e.g., a security certificate) may be stored in the secure memory. The machine-to-machine device may include secure key storage to protect data at rest and encryption keys (i.e. a shared secret). The encryption keys could be unique-derived keys (UDKs), which can be derived from user account information and other unique information. The machine-to-machine device may also store instructions for communicating with other devices and/or instructions for initiating a transaction.

In some embodiments, the machine-to-machine device may be able to communicate wirelessly with the wireless router 240, the user device 220, and/or the cell tower 245 (e.g., via Wifi, Bluetooth (classic and BLE or Bluetooth Low Energy), IR, GSM, etc.). Also, the machine-to-machine device may be able to access the Internet via the wireless router 240, the user device 220, and/or the cell tower 245 in order to communicate with the certificate authority network node 250. For example, in the absence of direct connectivity (e.g., WWAN, GSM), the machine-to-machine device may connect with local devices (e.g., wireless router 240, user device 220 which can act as a hotspot, etc.) and rely on the devices for Internet connectivity and communication. Accordingly, the machine-to-machine device may be remotely accessible by other devices, and further it may include a user interface for management purposes (such as updating ownership data and provisioning of information).

In some embodiments, the communication technology used by the machine-to-machine device may depend on the type of power source used by the machine-to-machine device. For example, if the machine-to-machine device has access to a regular, external power supply (e.g., as is common for smart refrigerators and other devices such as washer/driers, garage doors, cars, etc.) it may include a WiFi interface. Alternatively, if the machine-to-machine device relies on a battery instead of an external power supply, it may include a means of communication that consumes less power, such as low power Bluetooth interface, a ZigBee interface, a near field communication (NFC) or radio frequency (RF) interface, or any other suitable wireless access interface.

In some embodiments, the machine-to-machine device may instead be any other device that provides a household function. As noted above, FIG. 2 includes several devices such as a smart refrigerator 230, a water meter 232, a gas meter 234, and an electric meter 236. However, further examples of a household device include a television, lamp, fire alarm, home medical device, home alarm, washer/drier, garage door, car, and any other suitable device. Each of the machine-to-machine devices included in the system described herein may be capable of independently communicating with the certificate authority network node 250 in order to generate or obtain a security certificate which can be used to authenticate that device.

The certificate authority network node 250 may be configured to provision information onto the machine-to-machine device. In some embodiments, the information being provisioned onto the machine-to-machine device by the certificate authority network node 250 may be a security certificate. In some embodiments, the certificate authority network node 250 may be associated with an issuer of a payment instrument, a payment processing network associated with the payment instrument, a trusted third party, a digital wallet provider, a token server computer, and/or any other suitable entity.

Figure 3:
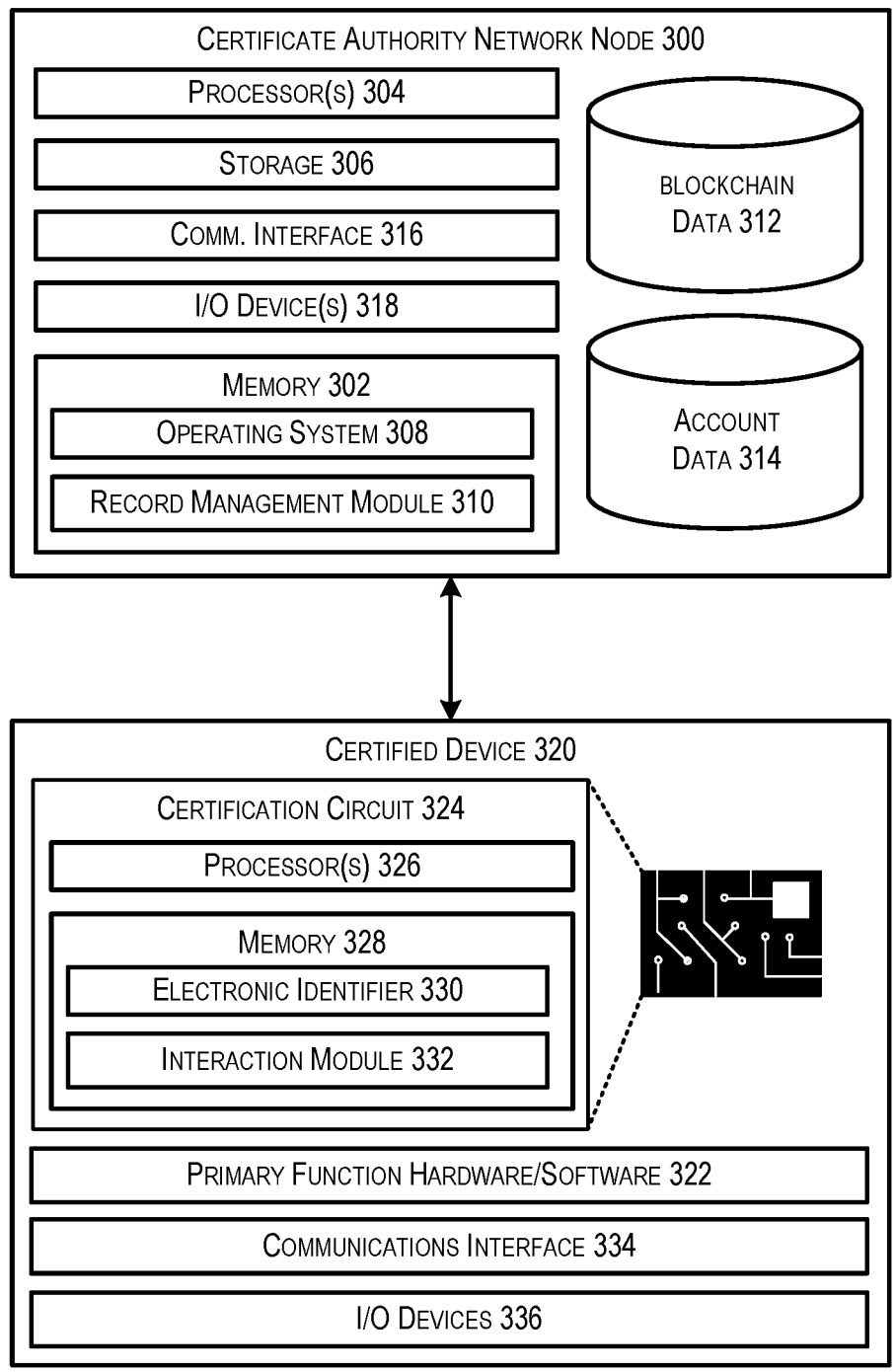
FIG. 3 depicts a diagram of an exemplary certificate authority network node and an exemplary certified device in accordance with at least some embodiments.

FIG. 3 depicts a diagram of an exemplary certificate authority network node 300 and an exemplary certified device 320 in accordance with at least some embodiments. The certificate authority network node 300 may be an example certificate authority network node 108 of FIG. 1. The certified device 320 may be an example certified entity device 102 of FIG. 1.

The certificate authority network node 300 may be any type of computing device capable of receiving an electronic record from a certified device 320, updating a blockchain associated with a user to include information from the electronic record, signing the blockchain using a private key, and distributing the blockchain to a client device associated with the user. In at least some embodiments, the certified device 320 may include at least one memory 302 and one or more processing units (or processor(s)) 304. The processor(s) 304 may be implemented as appropriate in hardware, computer-executable instructions, firmware or combinations thereof. Computer-executable instruction or firmware embodiments of the processor(s) 304 may include computer-executable or machine executable instructions written in any suitable programming language to perform the various functions described.

The memory 302, or any other memory described herein, may store program instructions that are loadable and executable on the processors, as well as data generated during the execution of these program instructions. The memory may be volatile (such as random access memory (RAM)) and/or non-volatile (such as read-only memory (ROM), flash memory, etc.). The certificate authority network node 300 may also include additional storage 306, such as either removable storage or non-removable storage including, but not limited to, magnetic storage, solid-state storage, optical disks, and/or tape storage. The disk drives and their associated computer-readable media may provide non-volatile storage of computer-readable instructions, data structures, program modules, and other data for the certificate authority network node 300. In some embodiments, the memory 302 may include multiple different types of memory, such as static random access memory (SRAM), dynamic random access memory (DRAM) or ROM.

Turning to the contents of the memory 302 in more detail, the memory 302 may include an operating system 308 and one or more application programs or services for implementing the features disclosed herein including at least a module for generating and managing electronic records associated with users and/or devices (record management module 310). The memory 302 may also include blockchain data 312, which includes data associated with past transactions (including transactions in which a security certificate has been issued) for a number of users/devices and account data 314, which includes data associated with a user and/or account.

In some embodiments, the record management module 210 may, in conjunction with the processor 204, be configured to receive a request for a security certificate from a certified device 320, generate a security certificate, and record an indication that a security certificate has been generated for the certified device 320. In some embodiments, the record management module 310 may, upon receiving the request, verify the authenticity or reliability of the certified device 320. The record management module 310 may receive, in the request, a portion of data signed by the certified device 320 using a private key associated with the certified device 320. The signed portion of data may then be verified by the certificate authority network node 300 using a public key associated with the certified device 320. In some embodiments, public keys for each certified device 320 may be distributed to, and stored by, each certificate authority network node 300 in a certificate authority network. In some embodiments, upon verifying the signed portion of data, the certificate authority network node 300 may be configured to generate a security certificate for the certified device 320 as well as an electronic record indicating that a security certificate has been generated for the certified device 320. In some embodiments, the electronic record may be a blockchain record. In some embodiments, the certified device 320 may be configured to generate the electronic record, append the electronic record to a blockchain, and sign the electronic record using a private key associated with the certified device 320. In these embodiments, the security certificate may be a link or reference to the electronic record.

In some embodiments, the certified device 320 may be any type of electronic device that is capable of generating or obtaining a security certificate using the techniques described herein. The certified device 320 may be an electronic device that is configured to transact with at least one additional electronic device. The certified device 320 may be configured to perform at least one primary function that is unrelated to the techniques described herein. This may involve primary function hardware/software 322, which may include any combination of mechanical components and software elements needed to perform the primary function of the certified device 320.

In addition, the certified device 320 may include a certification circuit 324 having one or more processor(s) 326 and a memory 328. The memory 328 may include a secure execution environment. In some embodiments, the certification circuit 324 may be an integrated circuit installed in the certified device 320. For example, certification circuit 324 may be a system on chip (SoC), an application-specific integrated circuit (ASIC), or a field programmable gate array (FPGA). Turning to the contents of the memory 328 in more detail, the memory 328 may include an electronic identifier 330 and one or more application programs or services for implementing the features disclosed herein including at least a module for generating or obtaining a security certificate as well as controlling interactions with other electronic devices (interaction module 232).

In some embodiments, the interaction module 332 may, in conjunction with the processor 326, be configured to generate or obtain a security certificate. The memory 328 may store an indication of a current status of a security certificate as well as an indication of any dates relevant to the current status (e.g., an expiration date). The interaction module 332 may be configured to update the current status upon exceeding or reaching any of these indicated dates. In some embodiments, upon detecting that the current status of the certified device 320 has been changed to an inactive status (e.g., expired), the interaction module 332 may be configured to automatically generate or obtain a new security certificate. In some embodiments, this may involve compiling various information stored by the certified device 320 (e.g., a current owner, payment information, etc.) and providing that information to a certificate authority network node 300. The certified device 320 may also transmit an electronic identifier 330 for the certified device 320 to the certificate authority network node 300. In some embodiments, the certified device 320 may be configured to sign at least a portion of the data provided to the certificate authority network node 300 using a private key assigned to the certified device 320. The private key may be stored on the certified device 320 by a manufacturer of the certified device 320. Upon verification of the signed portion of data, the interaction module 332 may receive a security certificate from the certificate authority network node 300.

In some embodiments, the interaction module 332 may, in conjunction with the processor 326, be configured to initiate and/or conduct a transaction with at least one other electronic device. For example, the interaction module 332 may be in communication with the primary function hardware/software 322 in order to determine when additional resources are required by the certified device 320. In this example, the interaction module 332 may be configured to communicate with a resource provider capable of providing the additional resources. In some embodiments, a set of policy data stored in relation to the security certificate may include an indication as to which resource providers the certified device 320 may initiate or conduct a transaction. In some embodiments, the set of policy data stored in relation to the security certificate may include an indication as to what resources, or how many of those resources, may be subject to a transaction by the certified device 320. In some embodiments, the certified device 320 may provide an electronic identifier and/or security certificate to the resource provider along with a transaction request so that the resource provider is able to verify the authenticity of the certified device 320.

The certified device 320 may also contain communications interface(s) 334 that enable the certified device 320 to communicate with any other suitable electronic devices. In some embodiments, the communication interface 334 may enable the server to communicate with other electronic devices on a network (e.g., on a private network). The certified device 320 may also include input/output (I/O) device(s) and/or ports 336, such as for enabling connection with a keyboard, a mouse, a pen, a voice input device, a touch input device, a display, speakers, a printer, etc.

Figure 4:
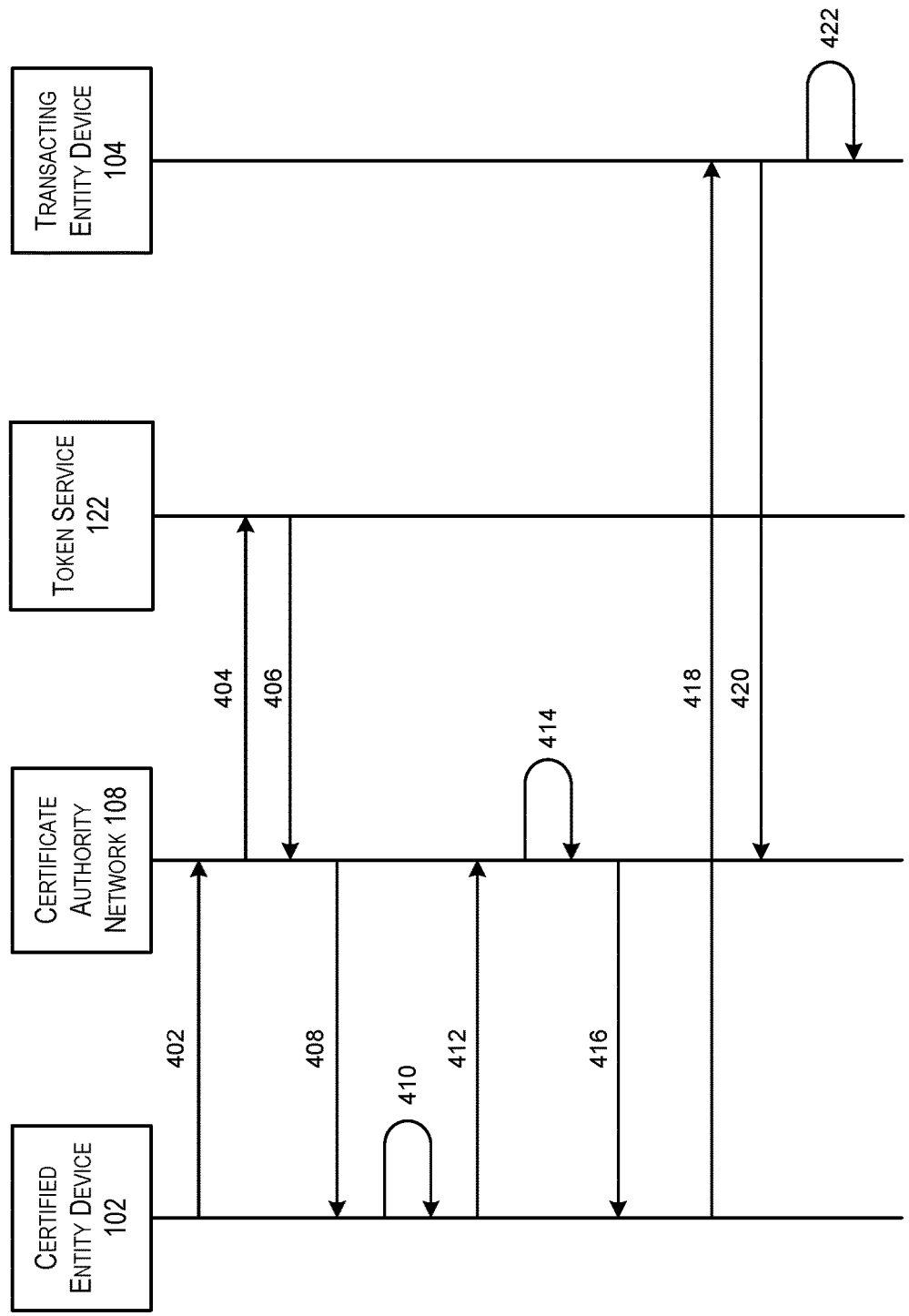
FIG. 4 depicts a swim lane diagram illustrating an example of various interactions that may take place between a number of components in accordance with at least some embodiments.

FIG. 4 depicts a swim lane diagram illustrating an example of various interactions that may take place between a number of components in accordance with at least some embodiments. Illustrated in FIG. 4 are interactions that may occur between a certified entity device 102, a certificate authority network 108, a token service 122, and a transaction entity device 104. Each of the certified entity device 102, the certificate authority network 108, the token service 122, and the transaction entity device 104 may be examples of their respective counterparts described with respect to FIG. 1 above. For the purposes of explanation, the example interactions depicted in FIG. 4 will be described as a process 400.

In some embodiments, a certified entity device 102 may be configured to detect that a new security certificate is needed. In some embodiments, the certified entity device 102 may determine that a current security certificate is no longer valid. For example, the certified entity device 102 may determine that a current ownership status of the certified entity device 102 has changed or that the current security certificate has expired. Upon making this determination, the certified entity device 102 may be configured to initiate the process 400.

At 402, the certified entity device 102 may be configured to transmit an electronic identifier (i.e., an identifier unique to the certified entity device) as well as other device-specific or user-specific information to the certificate authority. In some embodiments, a user may interact with the certified entity device 102 to provide user-specific information. In one example, the user may interact directly with the certified entity device 102 via a graphical user interface (GUI) on the certified entity device 102. In another example, the user may establish a communication channel (e.g., Bluetooth) between the certified entity device 102 and a mobile device (e.g., a smart phone) and may provide various information over the communication channel via a GUI of the mobile device. It should be noted that the user may not provide user information directly to the certified entity device 102 in some embodiments. For example, the user may log into an account maintained by the certificate authority network 108 (e.g., via a website) in order to update his or her information for that account. In some embodiments, the user may provide an identifier for the certified entity device 102 to the certificate authority network 108 in order to associate that certified entity device 102 with his or her account.

The certificate authority network 108 may be configured to identify an account related to the certified entity device (e.g., based on the user-specific information or electronic identifier). In some embodiments, the certificate authority may generate a set of policy data (e.g., a smart contract) that indicates permissions for the certified entity device based on a type or category of the certified entity device as well as user-defined constraints (e.g., based on account information). For example, each type of certified entity device 102 may be associated with a set of default policies (e.g., water purifiers can only purchase water filters, etc.). In this example, a user may place further constraints upon any particular device. By way of illustration, the user (e.g., by updating account information) may define a particular set of brands or versions of a resource that may be requested by the certified entity device 102, a set of particular resource providers from which the certified entity device 102 may request the resource, and/or an amount that the certified entity device 102 can spend on a particular resource.

In some embodiments, the certificate authority network 108 may be configured to request a token to be associated with the security certificate at 404. For example, the certificate authority network 108 may transmit one or more pieces of metadata information to be associated with the security certificate to the token service. In some embodiments, the metadata information may include sensitive information that a user would not want associated with the certified entity device 102 in the case that the information is obtained by an unauthorized party (e.g., a hacker). The user of a token can render the metadata information useless to an unauthorized party as the unauthorized party is unable to determine what certified entity device 102 is associated with the metadata information. The token service 122 may then be configured to store at least a portion of the transmitted information in relation to a token. The token service 122 may then transmit the token to the certificate authority network 108 at 406.

At 408, the certificate authority network 108 may be configured to respond to the electronic device's communication by providing information to be used in generating an electronic record. For example, the certificate authority may provide the set of policy data, the token, and/or an offset value to be used in an electronic signature. An offset value may be any value unique to the particular security certificate request that, when combined with information to be signed, ensures that the resulting signature is unique to that security certificate. In some embodiments, the token may be the offset value. In some embodiments, the offset value may simply be a counter variable (e.g., a variable used to count a number of requests or transactions received) which is incremented with the receipt of each request. It should be noted that an offset value may be any suitable unique value that may be shared between the certificate authority network 108 and the certified entity device 102. In some embodiments, the offset value may be generated by the certified entity device 102. For example, the certified entity device 102 may generate an offset value which may be provided in the request for the security certificate transmitted to the certificate authority network 108 at 402.

At 410, the certified entity device 102 may be configured to, upon receiving the information to be used in generating the electronic record, generate an electronic record to be associated with the requested security certificate. Exemplary electronic records that may be generated by the certified entity device 102 are described elsewhere in the disclosure. Once an electronic record has been generated, the certified entity device 102 may sign the electronic record using a private key associated with the certified entity device 102. This may involve performing a cryptographic operation on at least a portion of data included in the electronic record. This process is described in greater detail with respect to FIG. 6 below. In some embodiments, the private key may be stored on the certified entity device 102 by a manufacturer of the certified entity device 102. In some embodiments, the private key may be provided to the certified entity device 102 by the certificate authority network 108 (e.g., during an enrollment process). It should be noted that the electronic record may be a record in a blockchain, in which each record references the record before it. In these embodiments, a link to a previous record may be maintained by the certified entity device 102, the certificate authority network 108, or both and may be used when generating the electronic record.

The signed electronic record may be provided by the certified entity device 102 to the certificate authority network 108 at 412, which may then verify the authenticity of the generated electronic record using a public key associated with the electronic device at 414. Once verified, the electronic record may be appended to a database or other record of electronic records. For example, if the certificate authority network 108 uses a blockchain style of recordation, then the electronic record received by the certificate authority network 108 may be appended to the end of the blockchain upon its authenticity being verified. Once the electronic record has been verified, the certificate authority network 108 may provide a security certificate or a link to a security certificate to the certified entity device 102 at 416. It should be noted that in some embodiments, the electronic record is the security certificate.

At 418, after updating a current status of its security certificate, the certified entity device 102 may be configured to initiate a transaction with another entity. In some embodiments, the transaction may be initiated upon determining that a resource is needed by the certified entity device 102. In some embodiments, the resource may be a resource needed in relation to a primary function of the certified entity device 102. In response to determining that the resource is needed, the certified entity device 102 may identify an appropriate transacting entity (e.g., a resource provider or other vendor) from which more of the resource may be obtained. In some embodiments, the appropriate transacting entity may be identified based on a set of policy data included in the electronic record, at least a portion of which may also be stored upon the certified entity device 102. In some cases, the certified entity device 102 may also have provisioned upon it an indication of a payment device (e.g., a credit card number) that may be used to conduct a potential transaction for the resource. Once the certified entity device 102 has identified the appropriate transacting entity, the certified entity device 102 may generate a request for the resource to be transmitted to a transacting entity device 104 associated with the transacting entity. The generated request may include information related to the requested resource, the security certificate (or a link to the security certificate), payment information (e.g., the payment device or an account), and any other suitable transaction-related information.

At 420, the transacting entity device 104 may be configured to, upon receiving the request for the resource, verify that the security certificate is valid and that the requested transaction is permitted for the particular certified entity device 102 (e.g., based on the set of policy data in the electronic record). Once verified, the transacting entity device 104 may conduct the requested transaction using the provided payment information. It should be noted that this process may be performed automatically (e.g., without human interaction). For example, in some embodiments, the certified entity device 102 may include sensors, or may be in communication with sensors, that are able to ascertain a current quantity of the resource that is available. The certified entity device 102 may determine that additional resource is needed upon detecting that the current quantity of the resource is below a predetermined threshold quantity.

Figure 5:
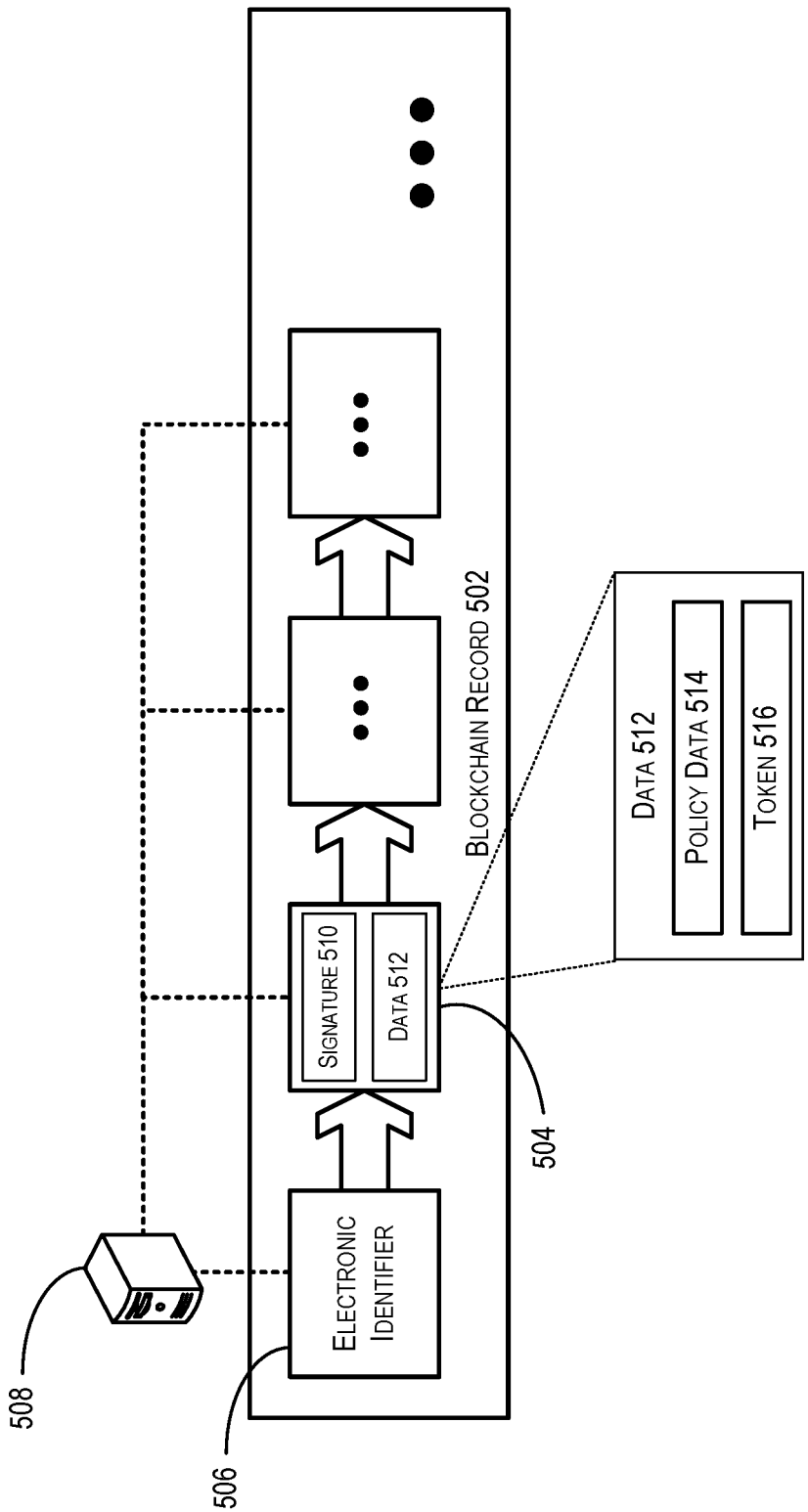
FIG. 5 depicts an example blockchain record that may be implemented in accordance with embodiments of the disclosure.

FIG. 5 depicts an example blockchain record that may be implemented in accordance with embodiments of the disclosure. In FIG. 5, a blockchain record 502 may comprise an electronic record 504 or other record of interactions distributed across a certificate authority network. As depicted, the record may comprise a blockchain, in which a number of electronic records 504 related to various electronic identifiers are processed in a "block," and then distributed to a number of nodes of the certificate authority network as part of the blockchain record 502.

As described above, a number of electronic records 504 may be associated with an electronic identifier 506. Although an electronic identifier 506 may be generated for any person, device, or entity, FIG. 5 focuses on embodiments in which the electronic identifier 506 is generated for a particular electronic device 508. In some embodiments, the electronic identifier 506 may be generated by a client device (e.g., the certified device 320 of FIG. 3) or a certification authority network node on behalf of a client device. In some embodiments, the electronic identifier 506 may be capable of being independently generated by an entity conducting a transaction with the person, device, or entity. For example, the electronic identifier may be generated according to a specified format using information related to the person, device, or entity.

As the electronic device 508 requests new security certificates, electronic records 504 may be generated for each request. In some embodiments, the electronic device 508 may generate the electronic records 504 and sign them with a private key associated with that electronic device 508. In some embodiments, the electronic record 504 may be generated by a certificate authority network node and may be signed by the electronic device 508. The electronic record 504 may include data 512. In some embodiments, the data 512 included in an electronic record 504 may include policy data 514, which may include an indication of permissions associated with the electronic device 508. In some embodiments, the data 512 included in an electronic record 504 may include also a token 516, which may be an indication of a location of device-specific information stored in a database. In some embodiments, the additional data 512 may also comprise an indication of any other suitable information.

As the particular electronic device 508 conducts transactions with various other entities (e.g., a transacting entity), the electronic device 508 may provide the entities with an indication or, or a link to, the electronic record 504 to prove that the electronic device 508 is authorized to conduct the transaction. The transacting entity may then check the authenticity of the electronic record 504 by obtaining a public key associated with the electronic device 508 which is stored on the certification authority network and verifying the signature 510 included in the electronic record. The transacting entity may then determine whether the transaction is in line with the policy data 514, which outlines the permissions of the electronic device 508 when conducting transactions. The electronic record 504 may be used by the transacting entity to assess an ability to conduct a transaction, what may be transacted for, or any other suitable transaction-related information for the electronic device 508.

Figure 6:
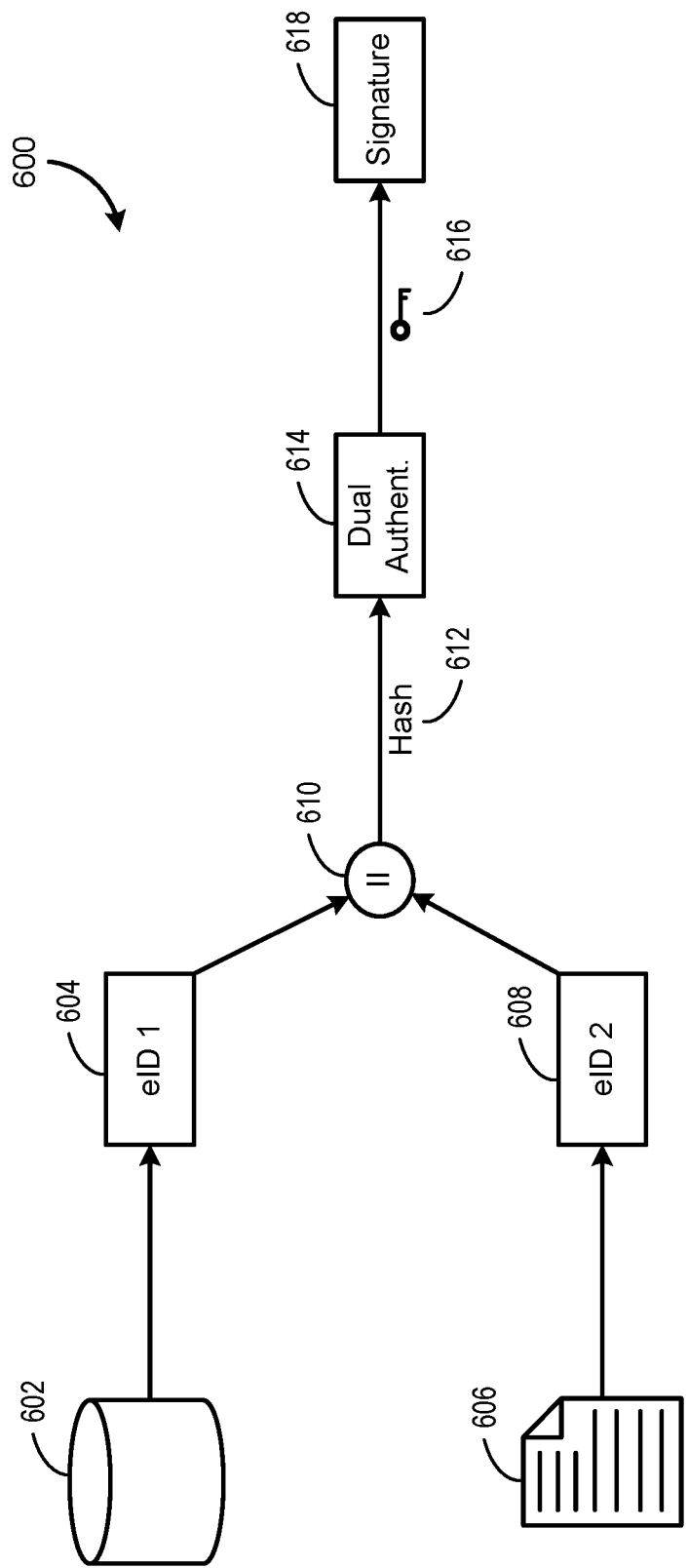
FIG. 6 depicts an illustrative example of a process for generating a signature that may be appended to an electronic record within a blockchain in order to enable verification of that electronic record in accordance with at least some embodiments.

FIG. 6 depicts an illustrative example of a process 600 for generating a signature that may be appended to an electronic record within a blockchain in order to enable verification of that electronic record in accordance with at least some embodiments. The process 600 may be performed by a certified device 320 as depicted in FIG. 3.

In some embodiments, the certified device 320 may include device information in memory 602. In some embodiments, the certified device 320 may retrieve or generate a first electronic identifier 604 (e.g., a device identifier) from device-specific information stored in memory 602. In some embodiments, the electronic identifier 604 may be retrieved directly from a data field in the memory of the certified device 320. In some embodiments, the electronic identifier 604 may be derived from one or more values stored in memory 602. For example, the certified device 320 may identify values for particular fields of the device information in memory 602 to be combined into a text string. The device information 602 may include any device-specific information. In some embodiments, the text string may include a combination of information that would be accessible to any entity that is able to interact with the certified device 320. In one illustrative example, the certified device 320 may combine a serial number of the certified device 320 with a model or version number of the certified device 320 to generate the electronic identifier 604. In some embodiments, the text string may be hashed in order to obfuscate the information included in the electronic identifier 604.

In some embodiments, the certified device 320 may also be provided with user-specific information 606 (which may relate to an owner or user of the certified device 320). Upon receiving the user-specific information 606, the certified device 320 may identify values for particular fields of the user-specific information 606 to be combined into a text string. In one illustrative example, the certified device 320 may combine a country code, owner name, date of birth, and last four digits of a social security number into a text string in order to obtain an electronic identifier 608. In some embodiments, the text string may be hashed in order to obfuscate the information included in the electronic identifier 608.

At 610, the certified device 320 may combine the electronic identifier 604 and the electronic identifier 608 into a single text string. The information may be combined using a concatenation process in some embodiments. For example, in some embodiments, each of the two text strings (the electronic identifier 604 and the electronic identifier 608) may be converted into a numeric string and the two numeric strings may then be added in order to form a third string. In some embodiments, this third string may be subjected to a hashing algorithm 612 in order to generate a user/dual authentication value 614. The dual authentication value 614 may be a derivative of the third string, which may be a text string. In some embodiments, the dual authentication value 614 may be combined with an offset value used to ensure that a signature generated using the process described herein is unique to a particular transaction or request. For example, the offset value may be added to, or appended to, the derivative of the third string to create the dual authentication value 614.

Once the dual authentication value 614 has been generated, the certified device 320 may sign the dual authentication value 614 at 616 in order to generate a signature 618. To "sign" the dual authentication value 614, the certified device 320 may use one or more cryptographic protocols, along with a private key associated with the certified device 320. The signature may then be appended to an electronic record which is added to a blockchain record (e.g., blockchain record 502 of FIG. 5). The signature may then be used by any entity that transacts with the certified device 320 to verify the authenticity of the electronic record. In some embodiments, the information needed to verify the signature (e.g., the device-specific information and user-specific information) may be stored by the certification authority network that includes the blockchain record. In some embodiments, this information may be included in the electronic record itself. In some embodiments, this information may be stored in a separate database (e.g., accessible using a token included in the electronic record). Accordingly, the certification authority network may control access to the stored information by ensuring that only authorized entities are able to obtain the information. The process described herein may be repeated by the certified device 320 to generate a signature for each electronic record within the blockchain each time that a security certificate is requested. In some embodiments, an offset value may be added or appended to the concatenated value 610 in order to ensure that each signature is unique to a particular electronic record. For example, the certified device 320 may add a counter value to the concatenated value 610 that represents a total number of electronic records that have been generated for the certified device 320. In some embodiments, the offset value may be a transaction identifier that corresponds to an identifier for the request for the security certificate.

In order to verify the signature generated using the process above, a resource provider or certification authority network may independently generate the electronic identifiers 604 and 608 in the manner described above (using provided device and user information). The resource provider or certification authority network may then verify the signature by using one or more verification algorithms, along with a public key associated with the certified device 320. The independently generated dual authentication value 614 is then compared to a value obtained using the public key, signature, and verification algorithm, and the resource provider or certification authority network determines whether the two values match. A match indicates a verified signature. It should be noted that the signature inherently provides dual authentication of the certified device 320. For example, the signature verifies not only that the device is authentic itself, but that the device is also in possession of information related to an owner or user of the device, which further reduces the risk of fraudulent transactions being conducted using the certified device 320.

Figure 7:
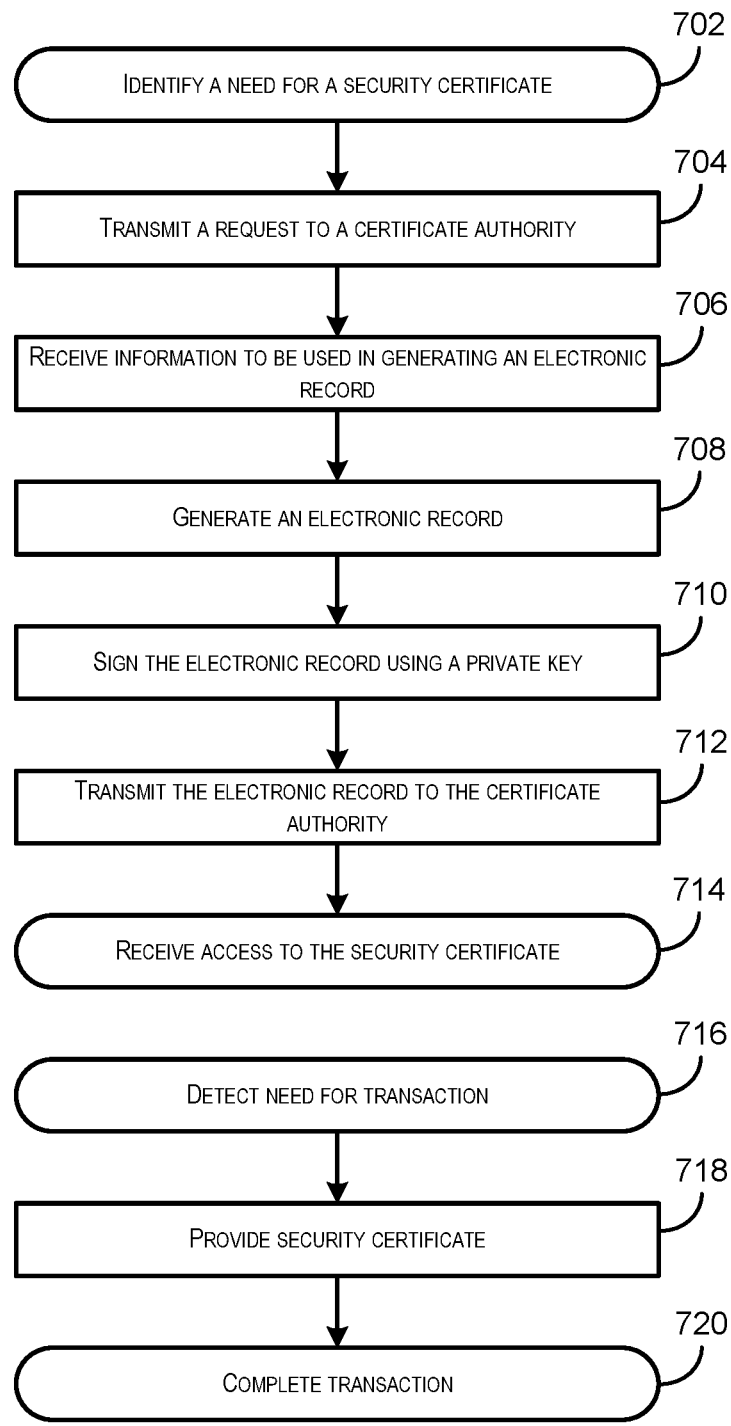
FIG. 7 depicts a flow diagram illustrating an example process in which a device may automatically obtain a security certificate in accordance with at least some embodiments.

FIG. 7 depicts a flow diagram illustrating an example process in which a device may automatically obtain a security certificate in accordance with at least some embodiments. The process 700 is illustrated as a logical flow diagram, each step of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 700 of FIG. 7 may be performed by at least the certified device 320 described with respect to FIG. 3. The code may be stored on a computer-readable storage medium, for example, in the form of a computer program including a plurality of instructions executable by one or more processors. The computer-readable storage medium may be non-transitory.

Process 700 may begin at 702, when a need for a security certificate is identified. In some embodiments, it may be determined that a status associated with a current security certificate is no longer valid. For example, it may be determined that a current ownership status of a certified entity device has changed or that the current security certificate has expired (e.g., an expiration date has been exceeded).

At 704, a request for a security certificate may be transmitted to a certificate authority. In some embodiments, the request may include an electronic identifier (i.e., an identifier unique to a particular entity) as well as other entity-specific information. The certificate authority may generate a set of policy data (e.g., a smart contract) that indicates permissions to be associated with the requested security certificate based on the received entity-specific information as well as information stored at the certificate authority. In some embodiments, the certificate authority may also generate or obtain a token to be associated with the security certificate. The token may be generated by the certificate authority or it may be obtained from a token service external to the certificate authority. At 706, the certificate authority may respond to the request with information to be used in generating an electronic record. The information may include at least a portion of the set of policy data, the token, an offset value, or any other suitable information that may be used by the requesting entity to generate an electronic record.

At 708, an electronic record may be generated. In some embodiments, the certificate authority may be a blockchain network and the electronic record may be a blockchain record. An electronic record may be associated with a particular electronic identifier that corresponds to the entity that generated the electronic record. The electronic record may include policy data that indicates what transactions may, or may not, be performed by the entity associated with the electronic record. Additionally, an electronic record may include a token, which may be mapped to account information stored in relation to the electronic record. Additionally, each electronic record may include a signature generated using a private key associated with the requesting entity that can be used to verify the authenticity of the electronic record at 710.

At 712, the signed electronic record may be transmitted to the certificate authority. The certificate authority may then verify the authenticity of the generated electronic record using a public key associated with the entity that generated the electronic record. Once verified, the electronic record may be appended to a database or other record of electronic records stored by the certificate authority.

At 714, access to the security certificate may be received. The certificate authority may provide a security certificate or a link to a security certificate to the requesting entity. In some embodiments, the electronic record is the security certificate. In these embodiments, the requesting entity may be provided with a location in which the electronic record is stored by the certification authority. Upon receiving the security certificate (or link) the requesting entity may update a status of its security certificate to reflect the newly obtained security certificate.

At 716, a need for a transaction may be detected. In some embodiments, the transaction may be initiated upon determining that a resource is needed by the entity that obtained the security certificate. The entity may then identify an appropriate transacting entity (e.g., a resource provider or other vendor) from which more of the resource may be obtained. In some embodiments, the appropriate transacting entity may be identified based on a set of policy data included in the electronic record.

At 718, a request may be generated and provided to an entity with which the transaction is to be conducted. The generated request may include information related to the requested resource, the security certificate (or a link to the security certificate), payment information (e.g., the payment device or an account), and any other suitable transaction-related information. At 720, the transaction may be completed. For example, the transacting entity may conduct the transaction upon verifying that the security certificate is valid.

Embodiments of the system described herein provide for a number of technical advantages over conventional systems. For example, in a conventional system in which electronic devices communicate with, and conduct transactions with, other electronic devices, a given electronic device may not have any security certificate that may be used to authenticate that the device should be trusted. Hence, the system described herein provides for increased security, and a decreased likelihood of fraudulent transactions. Additionally, in embodiments that use the dual signature described with respect to FIG. 5, the system is able to authenticate not only the device, but that the device is in the possession of an authorized user.

Additionally, in systems in which electronic devices are registered to a particular owner, the owner must take an active role in registering the device. Here, the owner is given the ability to provide very basic information and the enrollment (and security certificate renewal) process is handled in an automated fashion by the electronic device. This allows for a more robust system in which reliance on the owner to renew/apply for a security certificate is eliminated.

As described, some embodiments of the invention may involve implementing one or more functions, processes, operations, or method steps. In some embodiments, the functions, processes, operations, or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one," unless specifically indicated to the contrary.

What is claimed is:

1. A method comprising:
in response to determining that a security certificate is necessary, transmitting a request to a certificate authority, the request including an electronic identifier of an electronic device, the certificate authority comprising a certification authority network, the certification authority network storing an electronic record of electronic records, the electronic record comprising a blockchain record;
receiving, from the certificate authority, information to be used in generating the electronic record of the electronic records, the information including device-specific information and user-specific information, and the information being identified by the certificate authority using the electronic identifier of the electronic device, the electronic identifier comprising a hash of the user-specific information generated by a hashing algorithm;
generating the electronic record to comprise at least the electronic identifier and the information to be used in generating the electronic record, the electronic identifier generated according to a specified format based on the information, the specified format being particular to the device-specific information or the user-specific information;
signing at least a portion of the electronic record using a private key;
transmitting the electronic record to the certificate authority; and
receiving access to the security certificate upon verification of the electronic record by the certificate authority.

2. The method of claim 1, wherein the security certificate is determined to be necessary upon detecting that a current security certificate has expired.

3. The method of claim 1, wherein the information to be used in generating the electronic record comprises at least a token.

4. The method of claim 3, wherein the token is mapped to account information for the electronic record.

5. The method of claim 1, wherein the security certificate is determined to be necessary upon detecting a change to an ownership status.

6. The method of claim 1, wherein the security certificate is a secure sockets layer certificate.

7. The method of claim 1, wherein the method is performed by a webserver that hosts a website, and wherein the security certificate is associated with the website.

8. The method of claim 1, further comprising initiating a transaction by sending a transaction request to a resource provider that includes an indication of the security certificate and a request for a resource.

9. The method of claim 8, wherein the security certificate is associated with policy data that includes permissions for the transaction.

10. The method of claim 1, wherein receiving access to the security certificate comprises receiving a link or reference to the security certificate.

11. An electronic device comprising,
a processor, and
a memory coupled to the processor, the memory comprising code that, when executed by the processor, causes the electronic device to:
transmit a request to a certificate authority, the request including an electronic identifier of the electronic device, the certificate authority comprising a certification authority network, the certification authority network storing an electronic record of electronic records, the electronic record comprising a blockchain record;
receive, from the certificate authority, information to be used in generating the electronic record of the electronic records, the information including device-specific information and user-specific information, and the information being identified by the certificate authority using the electronic identifier of the electronic device, the electronic identifier comprising a hash of the user-specific information generated by a hashing algorithm;
generate the electronic record to comprise at least the electronic identifier and the information to be used in generating the electronic record, the electronic identifier generated according to a specified format based on the information, the specified format being particular to the device specific information or the user-specific information;
sign at least a portion of the electronic record using a private key;
transmit the electronic record to the certificate authority; and
receive a security certificate upon verification of the electronic record by the certificate authority.

12. The electronic device of claim 11, wherein the electronic device is a machine-to-machine device.

13. The electronic device of claim 12, wherein the code further causes the electronic device to, upon detecting that a resource used in a primary function of the machine-to-machine device is required, transmit a request for the resource to a resource provider that offers the resource, the request comprising the security certificate.

14. The electronic device of claim 11, wherein verification of the electronic record by the certificate authority comprises using a public key associated with the electronic device.

15. The electronic device of claim 11, wherein the request is transmitted to the certificate authority at an address stored in the memory.

16. The electronic device of claim 11, wherein the code is executed by the processor without user interaction.

17. The electronic device of claim 11, wherein the processor and the memory are included on an integrated circuit.

18. A certification authority network comprising:
an electronic record of electronic records, the electronic record comprising a blockchain record; and
a plurality of nodes, each of the plurality of nodes including instructions that, when executed, cause the node to:
receive a request for a security certificate from an electronic device, the request including an electronic identifier of the electronic device;
provide, to the electronic device, information to be used in generating the electronic record of the electronic records, the information including device-specific information and user-specific information, the generated electronic record comprising at least an electronic identifier, the electronic identifier generated according to a specified format based on the information, the specified format being particular to the device-specific information or the user-specific information, the information being identified using the electronic identifier of the electronic device, the electronic identifier comprising a hash of the user specific information generated by a hashing algorithm;

receive, from the electronic device, the generated electronic record including at least a signature portion;

identify a public key associated with the electronic device;

verify the signature portion of the generated electronic record using the public key; and upon verifying the signature portion of the generated electronic record, appending the generated electronic record to the record of electronic records.

19. The certification authority network of claim 18, wherein the certification authority network is a blockchain network that is distributed to each of the plurality of nodes.

* * * * *